United States Patent
Lee

(10) Patent No.: US 10,474,585 B2
(45) Date of Patent: Nov. 12, 2019

(54) NONVOLATILE MEMORY SYSTEM AND A METHOD OF OPERATING THE NONVOLATILE MEMORY SYSTEM

(71) Applicant: SAMSUNG ELECTRONICS CO., LTD., Suwon-si, Gyeonggi-do (KR)

(72) Inventor: Young-min Lee, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 263 days.

(21) Appl. No.: 14/727,079

(22) Filed: Jun. 1, 2015

(65) Prior Publication Data

US 2015/0347314 A1 Dec. 3, 2015

(30) Foreign Application Priority Data

Jun. 2, 2014 (KR) .................. 10-2014-0067063

(51) Int. Cl.
| G06F 12/00 | (2006.01) |
| G06F 12/1009 | (2016.01) |
| G06F 12/02 | (2006.01) |

(52) U.S. Cl.
CPC ...... *G06F 12/1009* (2013.01); *G06F 12/0246* (2013.01)

(58) Field of Classification Search
CPC ................. G06F 12/0246; G06F 12/1009
See application file for complete search history.

(56) References Cited

U.S. PATENT DOCUMENTS

| 6,212,614 B1 * | 4/2001 | Hoerig ............... G06F 9/30174 711/202 |
| 6,240,508 B1 * | 5/2001 | Brown, III ............. G06F 9/383 710/39 |
| 6,240,532 B1 * | 5/2001 | Cho ....................... G11C 29/08 714/42 |
| 7,711,923 B2 | 5/2010 | Rogers et al. |
| 7,924,628 B2 * | 4/2011 | Danon ................ G11C 11/5628 365/185.22 |
| 8,010,736 B2 | 8/2011 | Park et al. |
| 8,086,785 B2 | 12/2011 | Pyeon et al. |
| 8,244,968 B2 | 8/2012 | Chae |
| 8,738,840 B2 * | 5/2014 | Tzeng ................. G06F 12/0866 710/52 |
| 8,838,937 B1 * | 9/2014 | Katz ................... G06F 12/0246 711/103 |
| 8,880,845 B2 * | 11/2014 | Kong ................. G06F 12/1009 711/206 |
| 2003/0093610 A1 * | 5/2003 | Lai ..................... G06F 12/0246 711/103 |

(Continued)

FOREIGN PATENT DOCUMENTS

| KR | 1020100022282 | 3/2010 |
| KR | 1020100026227 | 3/2010 |

*Primary Examiner* — Prasith Thammavong
(74) *Attorney, Agent, or Firm* — F. Chau & Associates, LLC

(57) ABSTRACT

A nonvolatile memory system includes: a nonvolatile memory device that includes a nonvolatile memory cell array and a page buffer; and a memory controller that loads into the page buffer mapping data that is stored in the nonvolatile memory cell array, and in response to a logical address received from outside the memory controller, translates the logical address into a physical address based on the mapping data that is loaded into the page buffer.

20 Claims, 13 Drawing Sheets

(56) References Cited

U.S. PATENT DOCUMENTS

| | | |
|---|---|---|
| 2005/0055532 A1 | 3/2005 | Yu |
| 2009/0037652 A1* | 2/2009 | Yu .................. G06F 12/0246 711/103 |
| 2009/0113121 A1* | 4/2009 | Lee .................. G06F 12/0246 711/103 |
| 2009/0204872 A1* | 8/2009 | Yu .................. G06F 3/0613 714/773 |
| 2010/0023682 A1* | 1/2010 | Lee .................. G06F 12/0246 711/103 |
| 2010/0287333 A1* | 11/2010 | Lee .................. G06F 12/0873 711/103 |
| 2011/0072198 A1* | 3/2011 | Reiter .................. G06F 13/14 711/103 |
| 2012/0239854 A1 | 9/2012 | Hsueh et al. |
| 2013/0046920 A1 | 2/2013 | Ryu et al. |
| 2013/0124794 A1 | 5/2013 | Bux et al. |
| 2013/0219125 A1 | 8/2013 | Kusters et al. |
| 2013/0235671 A1 | 9/2013 | Lee |
| 2013/0238843 A1 | 9/2013 | Kim et al. |
| 2013/0238875 A1 | 9/2013 | Ramaraju et al. |
| 2013/0238931 A1 | 9/2013 | Suzuki et al. |
| 2013/0246891 A1 | 9/2013 | Manning et al. |
| 2013/0250678 A1 | 9/2013 | Joo et al. |
| 2013/0250698 A1 | 9/2013 | Kim |
| 2013/0254461 A1 | 9/2013 | Tan et al. |
| 2013/0254477 A1 | 9/2013 | Swanson et al. |
| 2013/0254630 A1 | 9/2013 | Murray et al. |
| 2013/0262742 A1 | 10/2013 | Park et al. |
| 2014/0149473 A1* | 5/2014 | Kim .................. G06F 17/30091 707/824 |
| 2014/0250272 A1* | 9/2014 | Hall .................. G06F 3/0611 711/118 |
| 2015/0347026 A1* | 12/2015 | Thomas .................. G06F 3/0611 711/103 |
| 2015/0347314 A1* | 12/2015 | Lee .................. G06F 12/1009 711/103 |
| 2016/0027525 A1* | 1/2016 | Kim .................. G11C 16/3459 365/185.12 |
| 2017/0160933 A1* | 6/2017 | De Jong .................. G06F 9/467 |

* cited by examiner

NONVOLATILE MEMORY SYSTEM AND A METHOD OF OPERATING THE NONVOLATILE MEMORY SYSTEM

CROSS-REFERENCE TO RELATED APPLICATION

This application claims priority under 35 U.S.C. § 119 to Korean Patent Application No. 10-2014-0067063, filed on Jun. 2, 2014, in the Korean Intellectual Property Office, the disclosure of which is incorporated by reference herein in its entirety.

TECHNICAL FIELD

The inventive concept relates to a nonvolatile memory system and a method of operating the same, and more particularly, to a nonvolatile memory system that previously caches mapping data and a method of operating the nonvolatile memory system.

DISCUSSION OF RELATED ART

A data storage device that retains stored data when not powered may be referred to as a nonvolatile memory. Examples of the nonvolatile memory may include a read-only memory (ROM), a magnetic disc, an optical disc, and a flash memory. The flash memory can be electrically erased and reprogrammed. The flash memory stores data according to a change in a threshold voltage of a metal-oxide-semiconductor (MOS) transistor. Examples of the flash memory may include a NAND flash memory and a NOR flash memory. In a flash memory, since a logical address that is input from a host is mapped to a physical address of the flash memory, mapping data of the logical address and the physical address are used to write or read data according to a command that is input from the host.

SUMMARY

An exemplary embodiment of the inventive concept provides a nonvolatile memory system that has improved performance and a method of operating the nonvolatile memory system.

According to an exemplary embodiment of the inventive concept, there is provided a nonvolatile memory system including: a nonvolatile memory device that includes a nonvolatile memory cell array and a page buffer; and a memory controller that loads into the page buffer mapping data that is stored in the nonvolatile memory cell array, and in response to a logical address received from outside the memory controller, translates the logical address into a physical address based on the mapping data that is loaded into the page buffer.

The memory controller may include a storage unit, store part of the mapping data that is stored in the nonvolatile memory cell array in the storage unit, and load another part of the mapping data into the page buffer.

When the mapping data includes mapping information corresponding to the physical address, the memory controller may receive the mapping data output from the page buffer, store the output mapping data in a storage unit that is provided in the memory controller, and perform address translation by using the stored mapping data.

The page buffer may include: a first register that temporarily stores data that is to be programmed into the nonvolatile memory cell array or data that is to be sensed from the nonvolatile memory cell array; and a second register that loads the mapping data from the nonvolatile memory cell array.

The second register may load the mapping data from the nonvolatile memory cell array, or receive next data that is to be programmed into the nonvolatile memory cell array from the memory controller and temporarily store the received next data.

After data is read from the nonvolatile memory device or after the nonvolatile memory device enters an idle state, the memory controller may load the mapping data into the page buffer.

The memory controller may queue first and second commands that are sequentially received from the outside of the memory controller, and during a read or write operation according to the first command, load into the page buffer the mapping data including map information corresponding to the logical address corresponding to the second command.

The nonvolatile memory cell array may include a first area and a second area, wherein the mapping data is stored in the first area and user data is stored in the second area.

The first area may include single-level cells that store 1-bit data per cell.

The memory controller may load into the page buffer part of the mapping data that is selected based on a last access time or an access frequency of the mapping data that is stored in the nonvolatile memory cell array.

The memory controller may include an interface unit that receives data from the outside of the memory controller or transmits data to the outside of the memory controller, wherein the interface unit performs command queuing.

The nonvolatile memory system may be applicable to a mobile electronic device.

According to an exemplary embodiment of the inventive concept, there is provided a method of operating a nonvolatile memory system, the method including: loading, using a memory controller, at least part of mapping data from a nonvolatile memory cell array into a page buffer; receiving a command and a logical address from outside the memory controller; and translating, using the memory controller, the logical address into a physical address based on the mapping data that is stored in the page buffer.

The translating of the logical address may include: when the mapping data includes mapping information corresponding to the logical address, outputting the mapping data from the page buffer and storing the mapping data in a storage unit of the memory controller; and translating the logical address into the physical address by using the stored mapping data.

The loading of the at least part of the mapping data into the page buffer may include queuing a first command and a second command that are sequentially received from the outside of the memory controller, and during a read or write operation according to the first command, loading into the page buffer the mapping data including mapping information corresponding to the logical address corresponding to the second command.

According to an exemplary embodiment of the inventive concept, there is provided a nonvolatile memory system including: a nonvolatile memory device including a memory cell array and a page buffer, the memory cell array configured to store mapping data in a first time period; and a memory controller configured to instruct the page buffer to cache the mapping data from the memory cell array in a second time period, determine whether a map hit occurs in the cached mapping data in response to a command and a logical address in a third time period, receive the cached mapping data from the page buffer when there is a map hit in a fourth time period, and translate the logical address into a physical address based on the received cached mapping data in a fifth time period.

The mapping data may be cached in the page buffer after a read operation or when the nonvolatile memory device is in an idle state.

The map hit may occur when the logical address is found in the mapping data that was cached in the page buffer.

The memory controller may include a storage unit configured to store the cached mapping data received from the page buffer.

The memory controller may include a flash translation layer configured to translate the logical address into the physical address.

BRIEF DESCRIPTION OF THE DRAWINGS

The above and other features of the inventive concept will become more apparent by describing in detail exemplary embodiments thereof with reference to the accompanying drawings in which.

DETAILED DESCRIPTION OF THE EMBODIMENTS

Figure 1:
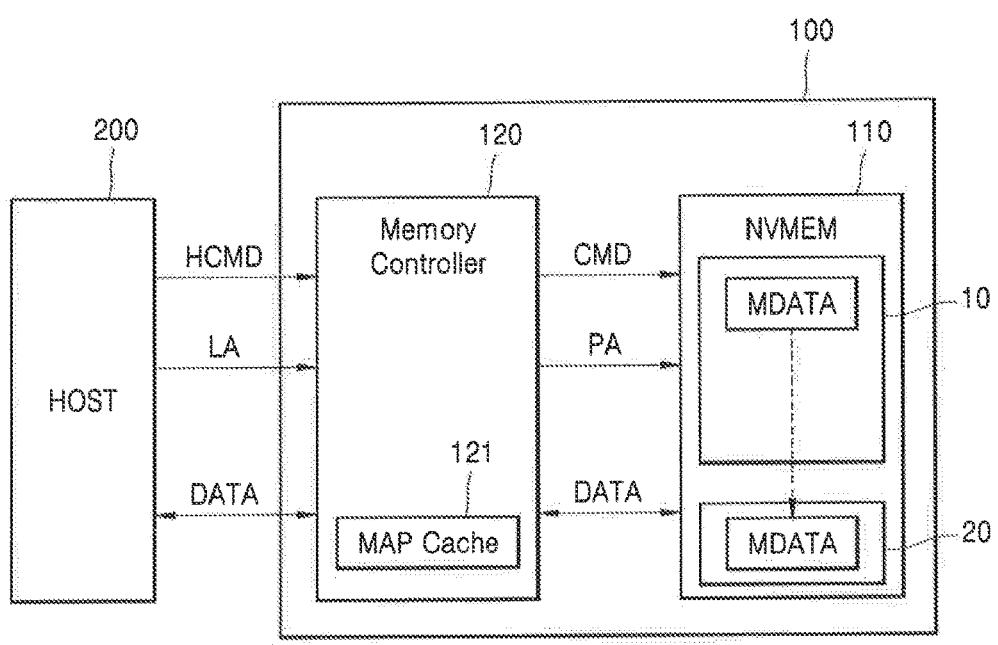
FIG. 1 is a block diagram of a nonvolatile memory system and a host, according to an exemplary embodiment of the inventive concept.

Exemplary embodiments of the inventive concept will now be described more fully with reference to the accompanying drawings. It should be understood, however, that the inventive concept may be embodied in many different forms and should not be construed as being limited to the embodiments set forth herein. Like reference numerals denote like elements in the drawings. In the attached drawings, sizes of structures may be exaggerated for clarity.

As used herein, the singular forms "a", "an", and "the" are intended to include the plural forms as well, unless the context clearly indicates otherwise. FIG. 1 is a block diagram of a nonvolatile memory system 100 and a host 200 that communicates with the nonvolatile memory system 100, according to an exemplary embodiment of the inventive concept.

The nonvolatile memory system 100 of FIG. 1 may be used in any of various electronic systems. The electronic systems may correspond to various devices. Examples of the electronic systems include a mobile device such as a smart phone or a tablet personal computer (PC). The nonvolatile memory system 100 may be used in a memory card such as an embedded multimedia card (eMMC) or a secure digital (SD) card, a micro SD card, or a universal flash storage (UFS).

Referring to FIG. 1, the nonvolatile memory system 100 may include a nonvolatile memory device 110 and a memory controller 120. The nonvolatile memory system 100 may store in the nonvolatile memory device 110 data DATA that is received from the host 200 based on a host command HCMD that is input from the host 200, or may read data requested by the host 200 from the nonvolatile memory device 110 and may transmit the data to the host 200. The host 200 may include an application processor (AP) 210. For example, the AP 210 may be a processor in a mobile platform and may be implemented as a system on a chip (SoC). The host 200 that communicates with the nonvolatile memory system 100 may write data to the nonvolatile memory system 100 or may read data from the nonvolatile memory system 100. In addition, data that is written or read by the host 200 may be defined as user data.

The nonvolatile memory device 110 may include a memory cell array 10 that includes a plurality of nonvolatile memory cells, and a page buffer 20. When data is programmed into the memory cell array 10 or is sensed from the memory cell array 10, the page buffer 20 may buffer the data and may temporarily store the data. Examples of the nonvolatile memory device 110 may include phase-change random-access memory (PRAM), mask read-only memory (MROM), programmable read-only memory (PROM), erasable programmable read-only memory (EPROM), electrically erasable programmable read-only memory (EEPROM), read-only memory (ROM), a magnetic disc, an optical disc, and a flash memory. The flash memory can be electrically erased and reprogrammed. The flash memory stores data according to a change in a threshold voltage of a metal-oxide-semiconductor (MOS) transistor. Examples of the flash memory may include a NAND flash memory and a NOR flash memory. The following description will assume that the nonvolatile memory device 110 is a NAND flash memory device.

The memory controller 120 controls an operation of the nonvolatile memory device 110 by applying various signals to the nonvolatile memory device 110. The memory controller 120 applies to the nonvolatile memory device 110 a command CMD and a physical address PA indicating a location of the memory cell array 10 that is to be accessed. In addition, data DATA for write and read operations is transmitted/received between the memory controller 120 and the nonvolatile memory device 110. In addition, the memory controller 120 may apply a clock signal and a chip selection signal to the nonvolatile memory device 110.

The nonvolatile memory device 110, for example, a flash memory, may perform data overwriting. To overwrite data in a flash memory, an erase operation is performed before the data is written, which is referred to as erase-before-write. An erase operation of the flash memory takes longer than a write operation. In addition, in the flash memory, read and write operations are generally performed in units of pages whereas an erase operation is performed in units of blocks that are larger than pages. Due to such characteristics that are different from those of other storage devices, the flash memory is designed to be compatible with an existing file system. To have compatibility with an existing file system, the memory controller 120 may manage the flash memory by using a virtual file system such as a flash translation layer (FTL).

The FTL maps a logical address LA that is input from the host 200 to the physical address PA by using a mapping method and generates mapping data MDATA including the address mapping information. The mapping data MDATA is stored in the memory cell array 10 of the nonvolatile memory device 110.

The logical address LA is an address for the user data that is recognized by the host 200. The host 200 may write or read the user data by indicating the logical address LA instead of the physical address PA that is an address of a space of the nonvolatile memory device 110 in which the user data is actually stored. The memory controller 120 may receive the host command HCMD and the logical address LA for the user data from the host 200 and may write the user data to the space indicated by the physical address PA corresponding to the logical address LA or may read the user data that is stored in the space indicated by the physical address PA.

The nonvolatile memory system 100 of the present embodiment may previously load into the page buffer 20 at least part of the mapping data MDATA that is stored in the nonvolatile memory device 110, and when the host command HCMD and the logical address LA are received, may translate the logical address LA into the physical address PA based on the mapping data MDATA that is already loaded into the page buffer 20.

For example, after data is read from the nonvolatile memory device 110 or after the nonvolatile memory device 110 enters an idle state and thus does not operate, the memory controller 120 may previously load at least part of the mapping data MDATA into the page buffer 20. The memory controller 120 may apply a data read command Dread and the physical address PA of the mapping data MDATA to the nonvolatile memory device 110, and the nonvolatile memory device 110 may load the mapping data MDATA into the page buffer 20 in response to the data read command Dread. The data read command Dread is a command requesting the nonvolatile memory device 110 to load data that is stored in the memory cell array 10 into the page buffer 20. The memory controller 120 may include and use a separate command for previously loading the mapping data MDATA into the page buffer 20.

After at least part of the mapping data MDATA is loaded into the page buffer 20, when the host command HCMD and the logical address LA are received from the host 200, the memory controller 120 determines whether a map hit occurs in the mapping data MDATA that is previously loaded in the page buffer 20. The term 'map hit' refers to a situation where the mapping data MDATA includes mapping information of the logical address LA that is applied from the host 200. If it is determined that a map hit occurs in the mapping data MDATA that is previously loaded into the page buffer 20, the memory controller 120 may apply a data output command Dout to the nonvolatile memory device 110. The data output command Dout is a command for reading data from the page buffer 20. The nonvolatile memory device 110 may output the mapping data MDATA that is loaded into the page buffer 20 to the memory controller 120 in response to the data output command Dout.

The memory controller 120 may store the mapping data MDATA that is output from the page buffer 20 in a storage unit 121 that is provided in the memory controller 120. The storage unit 121 may be a volatile memory having a high read speed. Examples of the storage unit 121 may include a static random-access memory (SRAM) and a dynamic random-access memory (DRAM). The FTL of the memory controller 120 may translate the logical address LA into the physical address PA based on the mapping data MDATA of the storage unit 121. The memory controller 120 may access the nonvolatile memory device 110 based on the physical address PA and the command CMD for performing the host command HCMD.

When the host command HCMD and the logical address LA are applied from the host 200, in order to read or write desired data, the memory controller 120 has to read the mapping data MDATA from the nonvolatile memory device 110. The memory controller 120 may find the physical address PA corresponding to the logical address LA that the host 200 requested to access by using the mapping data MDATA. However, it may take a long time for the nonvolatile memory device 110 to read data from the memory cell array 10. In particular, a time taken to load data that is stored in the memory cell array 10 into the page buffer 20, for example, a data load time, may be longer than a total read time (for example, a time taken to output data from the memory cell data array 10 to the memory controller 120). Accordingly, a response time to the host command HCMD is delayed.

However, the nonvolatile memory system 100 of the present embodiment may reduce the aforementioned delay time by previously loading the mapping data MDATA that is stored in the nonvolatile memory device 110 into the page buffer 20 before the host command HCMD is applied.

A cache capacity of the nonvolatile memory system 100 may be increased by using the page buffer 20 of the nonvolatile memory device 110 as a cache of the mapping data MDATA. For example, when a capacity of the page buffer 20 is 8 KB, the nonvolatile memory device 110 includes 4 dies and each of the 4 dies includes 4 planes, a cache capacity of the mapping data MDATA may be 128 KB (8 KB*4*4).

To have improved performance, a nonvolatile memory system may include the storage unit 121 that is provided in the memory controller 120, may read the mapping data MDATA from the memory cell array 10, may store the mapping data MDATA in the storage unit 121, and may use the mapping data MDATA. In this case, the storage unit 121 may be used as a map cache. However, when a nonvolatile memory system is applied to an electronic device having portability such as a mobile device, the storage unit 121 might not have enough capacity to store the mapping data MDATA. However, since the nonvolatile memory system 100 of the present embodiment may use the page buffer 20 as a map cache, the nonvolatile memory system 100 may increase cache capacity without increasing a size of the nonvolatile memory system 100.

Figure 2:
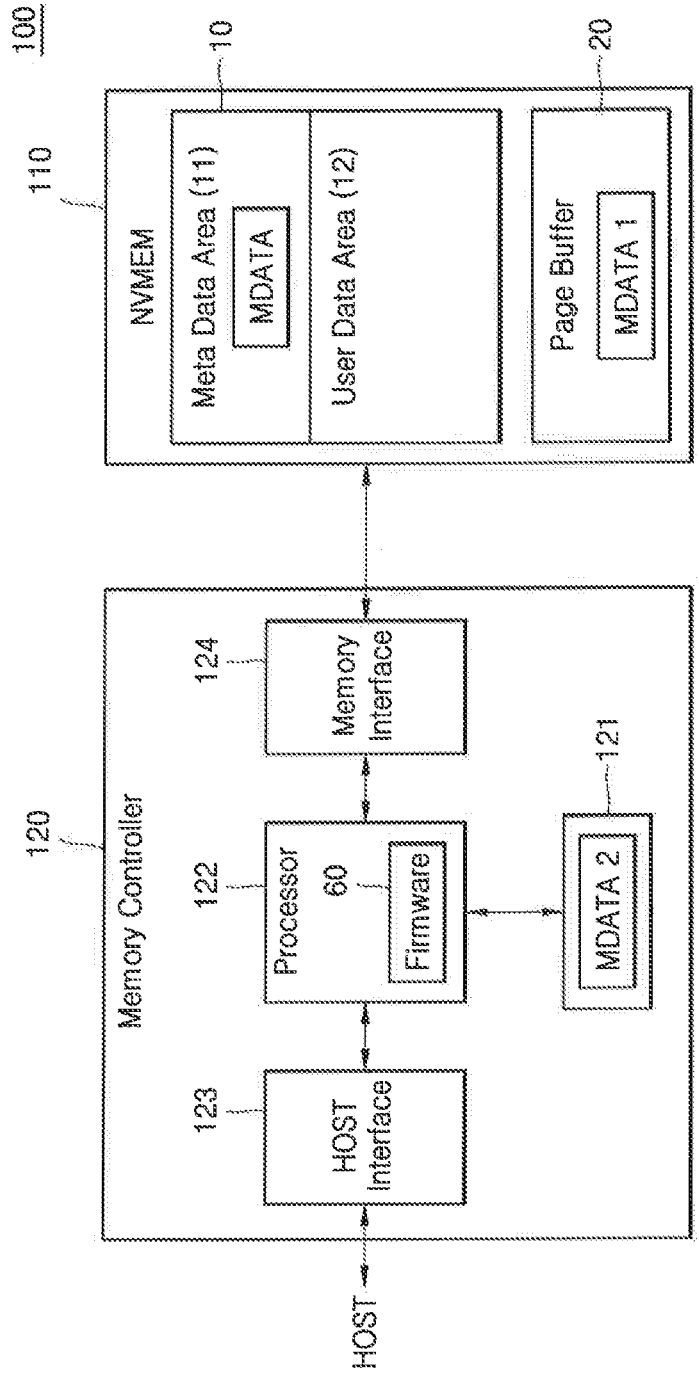
FIG. 2 is a block diagram of the nonvolatile memory system of FIG. 1, according to an exemplary embodiment of the inventive concept.

FIG. 2 is a block diagram of the nonvolatile memory system 100 of FIG. 1, according to an exemplary embodiment of the inventive concept.

Referring to FIG. 2, the nonvolatile memory system 100 may include the memory controller 120 and the nonvolatile memory device 110.

The nonvolatile memory device 110 may include the memory cell array 10 and the page buffer 20. The memory cell array 10 may be divided into a metadata area 11 and a user data area 12. Relative sizes of the metadata area 11 and the user data area 12 are not limited to those shown in FIG. 2. Various data that is used to operate the nonvolatile memory device 110 may be included in the metadata area 11. The various data is referred to as metadata. For example, when the nonvolatile memory device 110 is a flash memory device, the mapping data MDATA including mapping information between a logical address and a physical address, a program/erase cycle, and an initial read voltage level may be stored as metadata in the metadata area 11. User data UDATA that is programmed according to a user's request may be stored in the user data area 12.

When the nonvolatile memory device 110 includes single-level cells SLC that store 1-bit data per cell and multi-level cells MLC that store multiple-bit data per cell, the single-level cells SLC may be included in the metadata area 11 and the multi-level cells MLC may be included in the user data area 12. Since the amount of metadata such as the mapping data MDATA is less than that of the user data UDATA and may need to be more reliable, the metadata may be stored in the single-level cells SLC, and since the amount of user data UDATA is much greater than the metadata, the user data UDATA may be stored in the multi-level cells MLC. However, this is exemplary and the present embodiment is not limited thereto.

During a write or read operation of the memory cell array 10, for example, when data is programmed into the memory cell array 10 or data is sensed from the memory cell array 10, the page buffer 20 may buffer the data and may temporarily store the data. In addition, as described above with reference to FIG. 1, the page buffer 20 may perform a caching operation on the mapping data MDATA. First mapping data MDATA1 that is at least part of the mapping data MDATA and is stored in the metadata area 11 of the memory cell array 10 may be loaded into the page buffer 20, and the page buffer 20 may cache the first mapping data MDATA1.

The memory controller 120 may include a host interface 123, a processor 122, a memory interface 124, and the storage unit 121. Alternatively, the storage unit 121 may be provided outside the memory controller 120.

The host interface 123 may communicate with the host 200 according to a protocol. Examples of the protocol may include an eMMC, UFS, or SD protocol, serial advanced technology attachment (SATA), serial attached small computer system interface (SAS), non-volatile memory express (NVMe), and universal serial bus (USB).

The memory interface 124 may transmit the command CMD, the physical address PA, and the data DATA to the nonvolatile memory device 110 and may receive the data DATA according to a command requested by the nonvolatile memory device 110. In addition, the memory interface 124 may transmit a command corresponding to an operation (for example, garbage collection or wear-leveling) of the memory controller 120 or a command of the host 200 to the nonvolatile memory device 110.

The processor 122 may control the memory controller 120 and may transmit/receive signals to/from the host 200 and the nonvolatile memory device 110 through the host interface 123 and the memory interface 124. In addition, the processor 122 may include firmware 60 for controlling the memory controller 120 and the nonvolatile memory device 110. The firmware 60 may include the FTL described with reference to FIG. 1.

The processor 122 may map the logical address LA to the physical address PA for the user data UDATA and may manage mapping information as the mapping data MDATA by using the firmware 60.

To prolong the lifetime of the nonvolatile memory system 100, the processor 122 may change the mapping information to prevent a specific portion of the nonvolatile memory device 110 from being repeatedly programmed or erased. For example, the processor 122 may change the physical address PA corresponding to the logical address LA in order for alls cells to be uniformly programmed or erased. This operation is referred to as wear-leveling. In addition, the mapping information may be changed by using an operation such as garbage collection. Since the mapping information is retained when the host 200 or the nonvolatile memory system 100 is not powered, the mapping data MDATA may be stored in the nonvolatile memory device 110 along with the user data UDATA as shown in FIG. 2. In addition, the memory controller 120 may include the storage unit 121, and the first mapping data MDATA1 that is at least part of the mapping data MDATA that is stored in the nonvolatile memory device 110 may be stored in the storage unit 121 when the nonvolatile memory system 100 operates. For example, from among the mapping data MDATA, second mapping data MDATA2 including mapping information of the logical address LA that was most recently accessed may be stored in the storage unit 121. The possibility that the host 200 again requests to access the most recently accessed logical address LA is generally high. Accordingly, the second mapping data MDATA2 including the mapping information of the logical address LA that was most recently accessed may be stored in the storage unit 121 to increase a read speed to have a high map hit ratio. However, this is exemplary and the present embodiment is not limited thereto. The processor 122 may select part of the mapping data MDATA in consideration of temporal and spatial characteristics of the nonvolatile memory device 110 and may store the part of the mapping data MDATA in the storage unit 121.

When the host command HCMD and the logical address LA are received from the host 200, the processor 122 determines whether mapping information of the logical address LA is included in the first mapping data MDATA1 that is loaded into the page buffer 20 or is included in the second mapping data MDATA2 that is stored in the storage unit 121. For example, the processor 122 determines whether a map hit occurs in the first mapping data MDATA1 or the second mapping data MDATA2. When a map hit occurs in the first mapping data MDATA1, the memory controller 120 reads the first mapping data MDATA1 from the page buffer 20 and stores the first mapping data MDATA1 in the storage unit 121. The processor 122 may translate the logical address LA that is received from the host 200 into the physical address PA based on the first mapping data MDATA1. When a map hit occurs in the second mapping data MDATA2, the processor 122 may perform address translation based on the second mapping data MDATA2. When no map hit occurs in the first mapping data MDATA1 and the second mapping data MDATA2, the memory controller 120 may read at least part of the mapping data MDATA that is stored in the memory cell array 10, which includes information corresponding to the logical address LA, and may store the at least part of the mapping data MDATA in the storage unit 121. The processor 122 may perform address translation based on the at least part of the mapping data MDATA that is newly stored in the storage unit 121.

Figure 3:
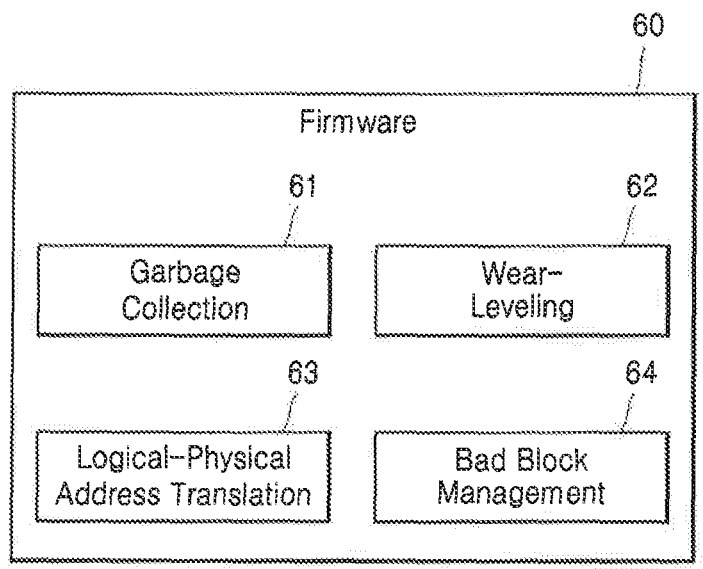
FIG. 3 is a block diagram of firmware of FIG. 2, according to an exemplary embodiment of the inventive concept.

FIG. 3 is a block diagram of the firmware 60 of FIG. 2, according to an exemplary embodiment of the inventive concept. As described above, when the nonvolatile memory system 100 is a flash memory system, the firmware 60 may include the FTL. The firmware 60 that manages the nonvolatile memory system 100 may be embedded software that is embedded in the flash memory system. The firmware 60 may include a functional block 61 for performing garbage collection, a functional block 62 for performing wear-leveling, a functional block 63 (e.g., the FTL) for performing an operation related to logical-physical address translation, and a functional block 64 for performing bad block management. The firmware 60 may further include various other functional blocks.

Figure 4:
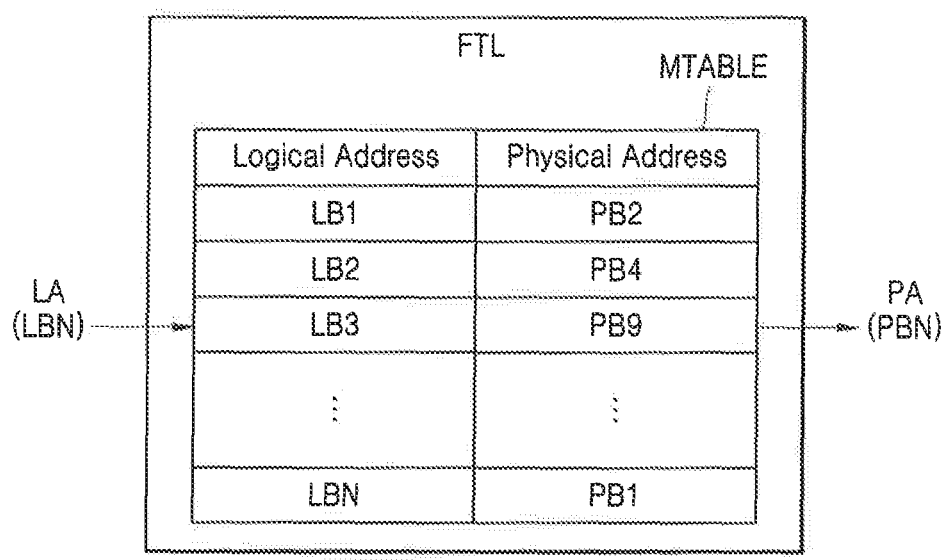
FIG. 4 is a block diagram of a flash translation layer (FTL), according to an exemplary embodiment of the inventive concept.

FIG. 4 is a block diagram for explaining address translation of the FTL, according to an exemplary embodiment of the inventive concept.

Referring to FIG. 4, the FTL may translate the logical address LA into the physical address PA based on a map table MTABLE including mapping information of the logical address LA and the physical address PA. As shown in FIG. 4, when the logical address LA is a second logic block LB2, a fourth physical block PB4 may be output as the physical address PA. Although, in FIG. 4, the FTL performs mapping in units of blocks, this is exemplary and the present embodiment is not limited thereto. Any of various mapping methods such as page mapping in which mapping is performed in units of pages and hybrid mapping in which the user data UDATA is mapped in units of blocks and the metadata is mapped in units of pages may be used.

Figure 5A:
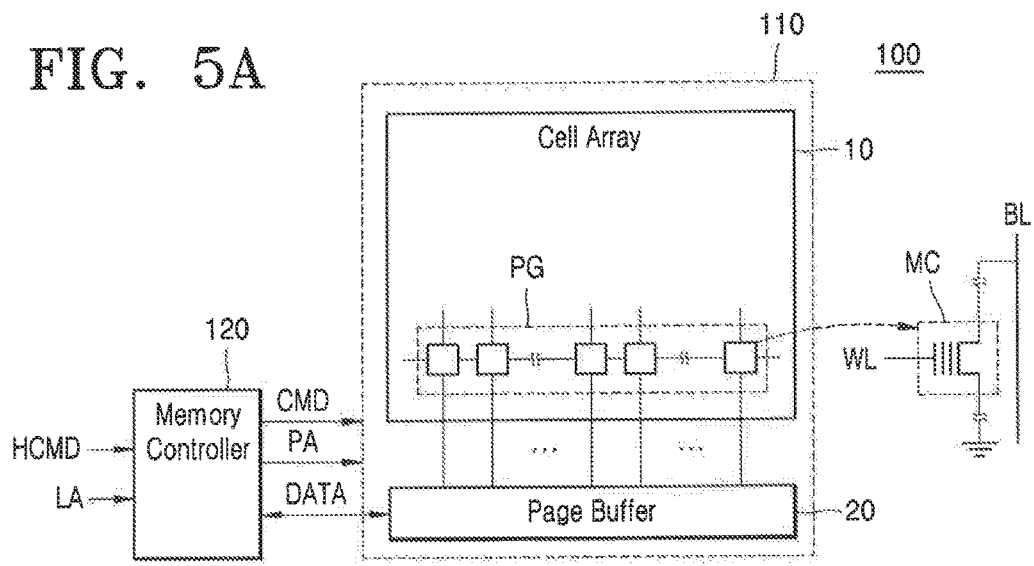
FIG. 5A is a block diagram for explaining an operation of a page buffer of FIG. 1, according to an exemplary embodiment of the inventive concept.
Figure 5B:
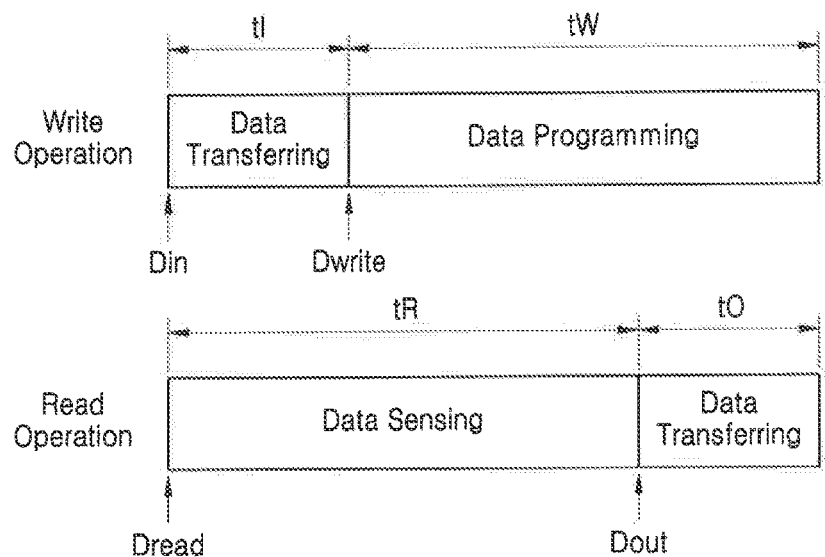
FIG. 5B is a timing diagram for explaining a buffering operation of the page buffer of FIG. 1, according to an exemplary embodiment of the inventive concept.
Figure 5C:
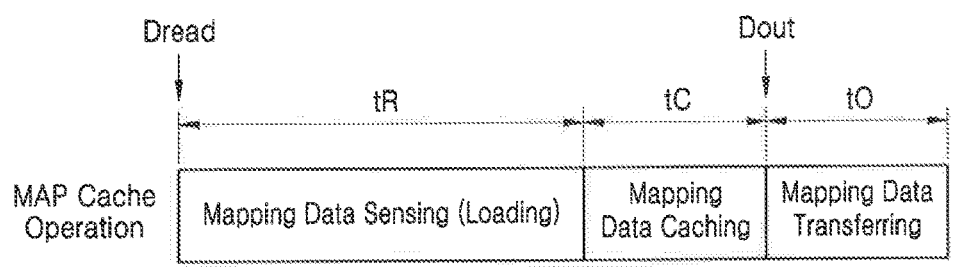
FIG. 5C is a timing diagram for explaining a mapping data caching operation of the page buffer of FIG. 1, according to an exemplary embodiment of the inventive concept.

FIG. 5A is a block diagram for explaining an operation of the page buffer 20 of FIG. 1, according to an exemplary embodiment of the inventive concept. FIG. 5B is a timing diagram for explaining a buffering operation of the page buffer 20 of FIG. 1, according to an exemplary embodiment of the inventive concept. FIG. 5C is a timing diagram for explaining a mapping data caching operation of the page buffer 20 of FIG. 1, according to an exemplary embodiment of the inventive concept.

Referring to FIG. 5A, the memory cell array 10 may include a plurality of memory cells MC and may be accessed by word lines WL and bit lines BL. The nonvolatile memory device 110 of FIG. 2 may be a flash memory device, for example, a NAND flash memory device. In this case, each of the memory cells MC may include a floating gate transistor, and a plurality of memory cells that are connected to the same word line WL may be referred to as a page PG. Each of the memory cells MC is a memory unit that may change between at least two states, and each state may correspond to data. In addition, since the memory cell MC may keep its original state when the nonvolatile memory device 110 is not powered, the memory cell MC may retain programmed data. Although the following description assumes that the nonvolatile memory device 110 is a NAND flash memory device, the present embodiment is not limited thereto.

The page buffer 20 may be connected to each bit line BL of the page PG of the memory cells MC. Accordingly, the page buffer 20 may temporarily store data in units of pages PG.

A buffering operation of the page buffer 20 during write and read operations of the nonvolatile memory device 110 will now be explained with reference to FIG. 5B.

When a write operation is performed, the memory controller 120 may transmit a data input command Din, the physical address PA, and the data DATA to the nonvolatile memory device 110. The data input command Din that is one of plural commands that request a write operation of the nonvolatile memory device 110 may be a command for requesting the page buffer 20 to buffer the transmitted data DATA. The page buffer 20 may receive data of one page for a time tI and may buffer the received data. When the data of one page is received, the memory controller 120 may transmit a data write command Dwrite to the nonvolatile memory device 110. The data write command Dwrite may be a command for requesting the nonvolatile memory device 110 to program data that is temporarily stored in the page buffer 20 into a page according to the physical address PA of the memory cell array 10. In response to the data write command Dwrite, the data that is temporarily stored in the page buffer 20 may be programmed into the memory cell array 10. Until the programming is completed, the page buffer 20 may retain the data DATA for a time tW.

When a read operation is performed, the memory controller 120 may transmit a data read command Dread and the physical address PA to the nonvolatile memory device 110. The data read command Dread that is one of plural commands that request a read operation of the nonvolatile memory device 110 may be a command for requesting data that is stored in the memory cell array 10 to be sensed and loaded into the page buffer 20. The memory cell array 10 may be sensed for a time tR, and the data that is stored in the memory cell array 10 may be loaded into the page buffer 20. The page buffer 20 may buffer the loaded data. When data sensing of one page is completed, the memory controller 120 may transmit a data output command Dout to the nonvolatile memory device 110. In response to the data output command Dout, the page buffer 20 may transmit the data DATA to the memory controller 120. The page buffer 20 may transmit data that is temporarily stored to the memory controller 120 for a time tO. In this case, a ratio of the times tI, tW, tR, and tO are not limited to those shown in FIG. 5B.

Next, a mapping data caching operation of the page buffer 20 will now be explained with reference to FIG. 5C. Referring to FIG. 5C, the memory controller 120 may transmit the data read command Dread to the nonvolatile memory device 110. The physical address PA indicating a location where the mapping data MDATA to be cached in the page buffer 20 is stored may also be transmitted to the nonvolatile memory device 110. The physical address PA may be an address corresponding to the metadata area 11

(see FIG. 2). The memory cell array 10 may be sensed for a time tR, and the mapping data MDATA that is stored in the memory cell array 10 may be loaded into the page buffer 20. The page buffer 20 may buffer the loaded mapping data MDATA. Unlike the read operation of FIG. 5B, after the data sensing is completed, the memory controller 120 does not transmit the data output command Dout to the nonvolatile memory device 110. Since the page buffer 20 caches the mapping data MDATA for a time tC until the data output command Dout is received, the page buffer 20 may be used as a cache of the mapping data MDATA. When the host command HCMD and the logical address LA are received, the memory controller 120 determines whether a map hit occurs between the mapping data MDATA that is cached in the page buffer 20 and the logical address LA. If a map hit occurs in the mapping data MDATA, the memory controller 120 transmits the data output command Dout to the nonvolatile memory device 110. In response to the data output command Dout, the page buffer 120 may transmit the mapping data MDATA to the memory controller 120, and for a time tO, the mapping data MDATA may be transmitted. If no map hit occurs in the mapping data MDATA, the page buffer 20 does not transmit the mapping data MDATA. In this case, the page buffer 20 may perform a buffering operation for a write operation and a read operation of the nonvolatile memory device 110 as described above with reference to FIG. 5B.

Figure 6:
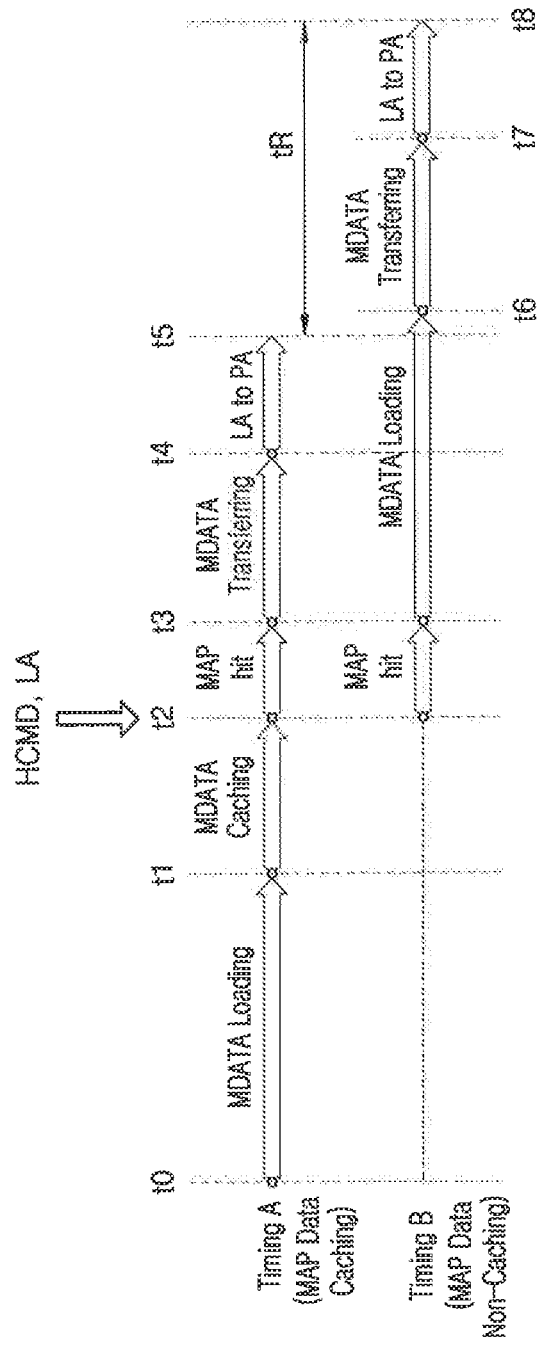
FIG. 6 illustrates timing diagrams for explaining an operation of the nonvolatile memory system of FIG. 1, according to an exemplary embodiment of the inventive concept.

FIG. 6 illustrates timing diagrams for explaining an operation of the nonvolatile memory system 100 of FIG. 1, according to an exemplary embodiment of the inventive concept.

Referring to FIG. 1, the timing diagram Timing A illustrates a case where the page buffer 20 (see FIG. 1) caches the mapping data MDATA (hereinafter, referred to as mapping data caching), and the timing diagram Timing B illustrates a case where the page buffer 20 does not cache the mapping data MDATA (hereinafter, referred to as mapping data non-caching). Results obtained after comparing the timing diagrams Timing A and Timing B will now be explained. During the mapping data caching (in the timing diagram Timing A), before a time t2 when the host command HCMD and the logical address LA are received from the outside (e.g., the host 200), the mapping data MDATA that is stored in the memory cell array 10 of the nonvolatile memory device 110 may be loaded into the page buffer 20 for a time t0 to t1 and then the page buffer 20 may cache the loaded mapping data MDATA for a time t1 to t2. When the host command HCMD and the logical address LA are received at the time t2, it is determined whether a map hit occurs in the cached mapping data MDATA for a time t2 to t3). During the mapping data caching, the possibility that a map hit occurs in the mapping data MDATA is high, and when a map hit occurs in the mapping data MDATA, the page buffer 20 may transmit the mapping data MDATA to the memory controller 120 for a time t3 to t4). The memory controller 120 translates the logical address LA into the physical address PA based on the mapping data MDATA for a time t4 to t5. During the mapping data non-caching (in the timing diagram Timing B), the possibility that a map hit occurs in the mapping data MDATA is low, and when no map hit occurs in the mapping data MDATA, the memory controller 120 reads the mapping data MDATA including mapping information corresponding to the logical address LA from the memory cell array 10. The mapping data MDATA may be loaded from the memory cell array 10 into the page buffer 20 for a time t3 to t6 and then may be transmitted from the page buffer 20 to the memory controller 120 for a time t6 to t7. A time taken to receive the host command HCMD and then translate the logical address LA into the physical address PA during the mapping data non-caching (in the timing diagram Timing B) may be longer by a time tR than that during the mapping data caching (in the timing diagram Timing A). The time tR may be a period of time for which the mapping data MDATA is loaded into the page buffer 20. Hence, according to the present embodiment, a delay time of the nonvolatile memory system 100 may be reduced by using the page buffer 20 as a cache of the mapping data MDATA.

Figure 7:
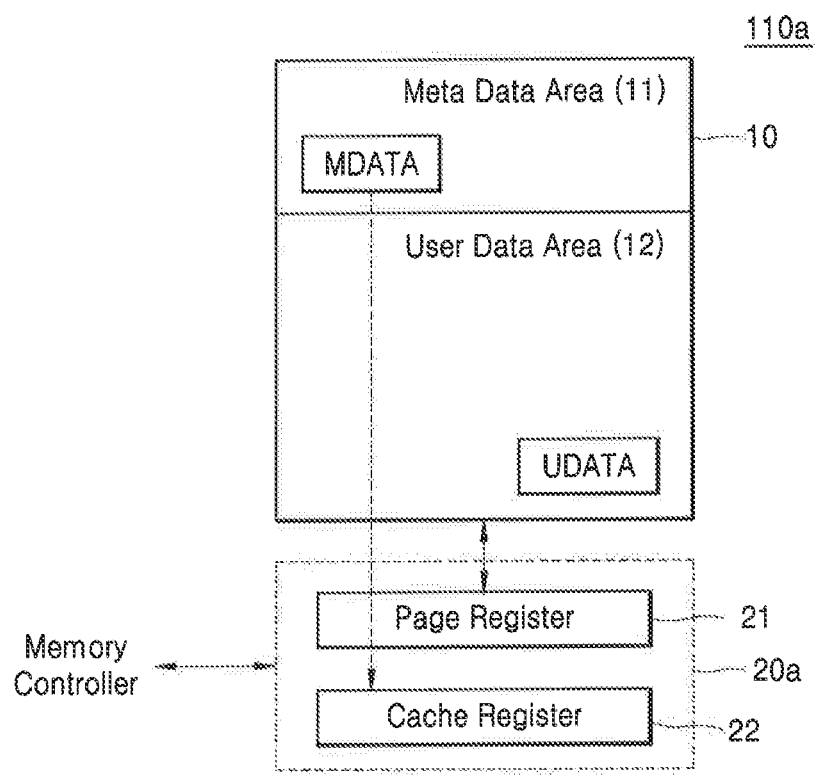
FIG. 7 is a block diagram of a nonvolatile memory device of the nonvolatile memory system of FIG. 1, according to an exemplary embodiment of the inventive concept.

FIG. 7 is a block diagram of a nonvolatile memory device 100a of the nonvolatile memory system 100 of FIG. 1, according to an exemplary embodiment of the inventive concept.

Referring to FIG. 7, the nonvolatile memory device 110a may include the memory cell array 10 and a page buffer 20a. The memory cell array 10 is the same as that of FIG. 2, and thus a repeated explanation thereof will not be given.

The page buffer 20a may include a plurality of registers, for example, first and second registers 21 and 22. Although the page buffer 20a includes two registers in FIG. 7, the present embodiment is not limited thereto. The first register 21 (e.g., page register) may buffer and temporarily store data that is programmed into the memory cell array 10 or data that is sensed from the memory cell array 10. The second register 22 (e.g., cache register) may load the mapping data MDAT from the memory cell array 10. For example, the first register 21 may be a register that is used during write and read operations of the nonvolatile memory device 110a, and the second register 22 may be a register that is selectively used. For example, when data is programmed into the memory cell array 10, the second register 22 that is selectively used during a double buffering operation of the page buffer 20a may receive and temporarily store data to be programmed next time. The second register 22 may be selectively used during a double buffering operation, or may be used to load the mapping data MDAT from the memory cell array 10 and cache the mapping data MDATA.

The page buffer 20a may further include other types of registers such as a sensing register. When any of the first and second registers 21 and 22 is not used during a write or read operation of the nonvolatile memory device 110a, the register may be used as a cache of the mapping data MDATA.

As described above, a register that does not perform a buffering operation during a write or read operation of the nonvolatile memory device 110a from among the first and second registers 21 and 22 of the page buffer 20a may be selectively used as a cache of the mapping data MDATA.

Figure 8:
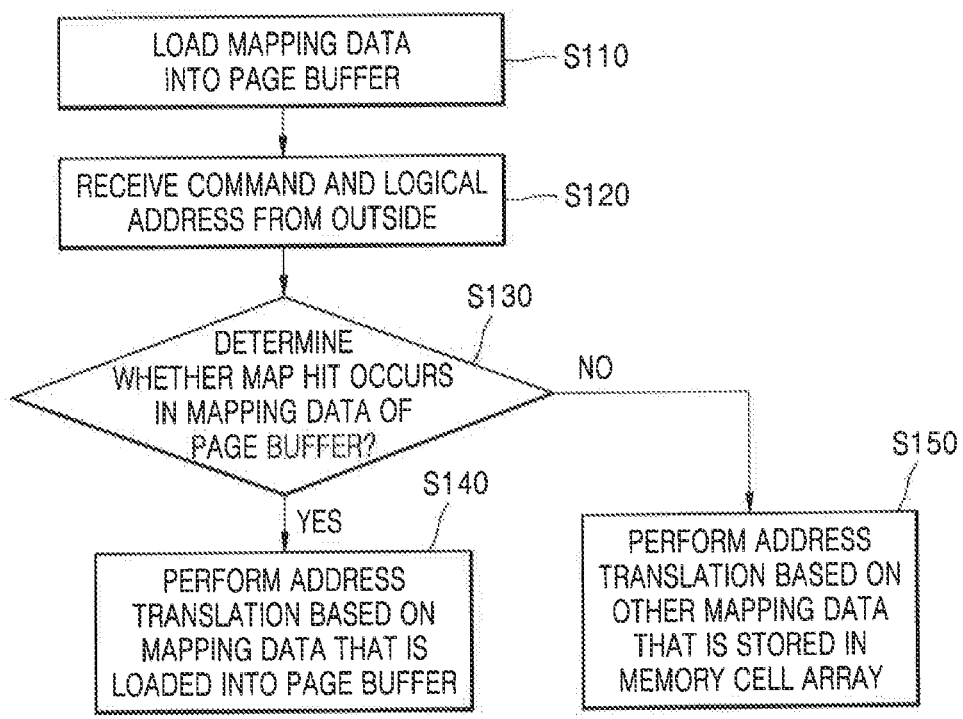
FIG. 8 is a flowchart of a method of operating the nonvolatile memory system of FIG. 1, according to an exemplary embodiment of the inventive concept.
Figure 9:
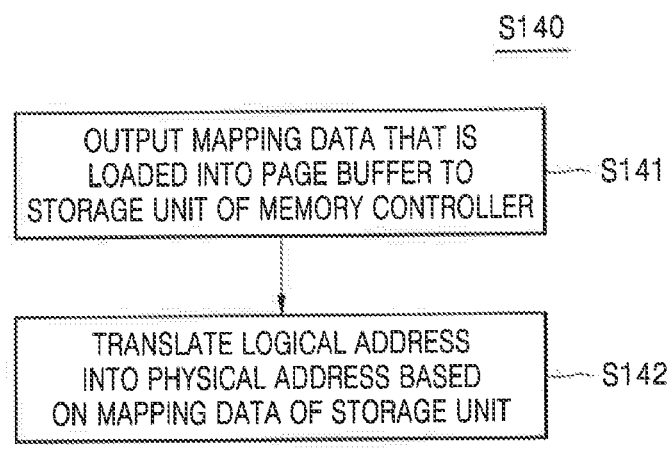
FIG. 9 is a flowchart of a method of translating an address based on mapping data that is loaded into the page buffer in the method of FIG. 8, according to an exemplary embodiment of the inventive concept.
Figure 10:
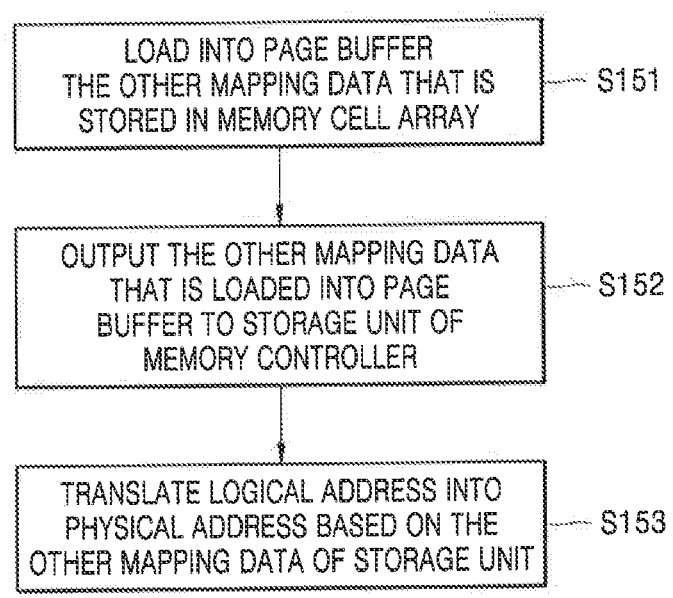
FIG. 10 is a flowchart of a method of translating an address based on other mapping data that is stored in a memory cell array in the method of FIG. 8, according to an exemplary embodiment of the inventive concept.

FIG. 8 is a flowchart of a method of operating the nonvolatile memory system 100 of FIG. 1, according to an exemplary embodiment of the inventive concept. FIG. 9 is a flowchart of a method of translating an address based on mapping data that is loaded into the page buffer 20 in the method of FIG. 8, according to an exemplary embodiment of the inventive concept. FIG. 10 is a flowchart of a method of translating an address based on other mapping data that is stored in the memory cell array 10 in the method of FIG. 8, according to an exemplary embodiment of the inventive concept.

Referring to FIG. 8, in operation S110, mapping data is loaded into the page buffer 20. After data is read from the nonvolatile memory device 110 or after the nonvolatile memory device 110 enters an idle state, the memory controller 120 (see FIG. 1) may load the mapping data that is stored in the memory cell array 10 into the page buffer 20. However, this is exemplary and the present embodiment is not limited thereto. While read and write operations of the nonvolatile memory device 110 are being performed, the mapping data may be loaded into the page buffer 20 as long as it is not a time for which the memory cell array 10 is programmed or sensed.

Next, in operation S120, for example, a host command and a logical address are received from the host 200. In operation S130, it is determined whether a map hit occurs in the mapping data that is loaded into the page buffer 20. The memory controller 120 may determine that a map hit occurs in the mapping data when the logical address received from the host 200 is found in the mapping data that was loaded into the page buffer and may determine that a map miss occurs when the logical address is not found in the mapping data.

If it is determined in operation S130 that a map hit occurs, the method proceeds to operation S140. In operation S140, address translation may be performed based on the mapping data that is loaded into the page buffer 20. Referring to FIG. 9, in operation S141, the mapping data that is loaded into the page buffer 20 is read. The mapping data may be output from the page buffer 20 and may be transmitted to the memory controller 120. The mapping data that is transmitted to the memory controller 120 may be stored in the storage unit 121 that is provided in the memory controller 120. The storage unit 121 may be a map cache and may be a memory having a high read speed. For example, the storage unit 121 may be a volatile memory such as DRAM or SRAM.

In operation S142, the logical address may be translated into a physical address based on the read mapping data. The FTL that is provided in the memory controller 120 may perform address translation by referring to the mapping data of the storage unit 121. The FTL may convert a logical block number into a physical block number based on the mapping data, or may convert a logical page number into a physical page number based on the mapping data. The memory controller 120 may access the nonvolatile memory device 110 based on the translated address, in other words, the physical address.

Referring back to FIG. 8, otherwise, if it is determined in operation S130 that a map miss occurs, the method proceeds to operation S150. In operation S150, address translation may be performed based on other mapping data that is stored in the memory cell array 10. Referring to FIG. 10, in operation S151, the other mapping data that is stored in the memory cell array 10 is loaded into the page buffer 20. The other mapping data may be mapping data including mapping information of the received logical address.

After the other mapping data is loaded into the page buffer 20, in operation S152, the other mapping data that is loaded into the page buffer 20 is read. The other mapping data may be output from the page buffer 20 and may be transmitted to the memory controller 120. The other mapping data that is transmitted to the memory controller 120 may be stored in the storage unit 121 that is provided in the memory controller 120. In operation S153, the logical address may be translated into the physical address based on the other mapping data.

Figure 11:
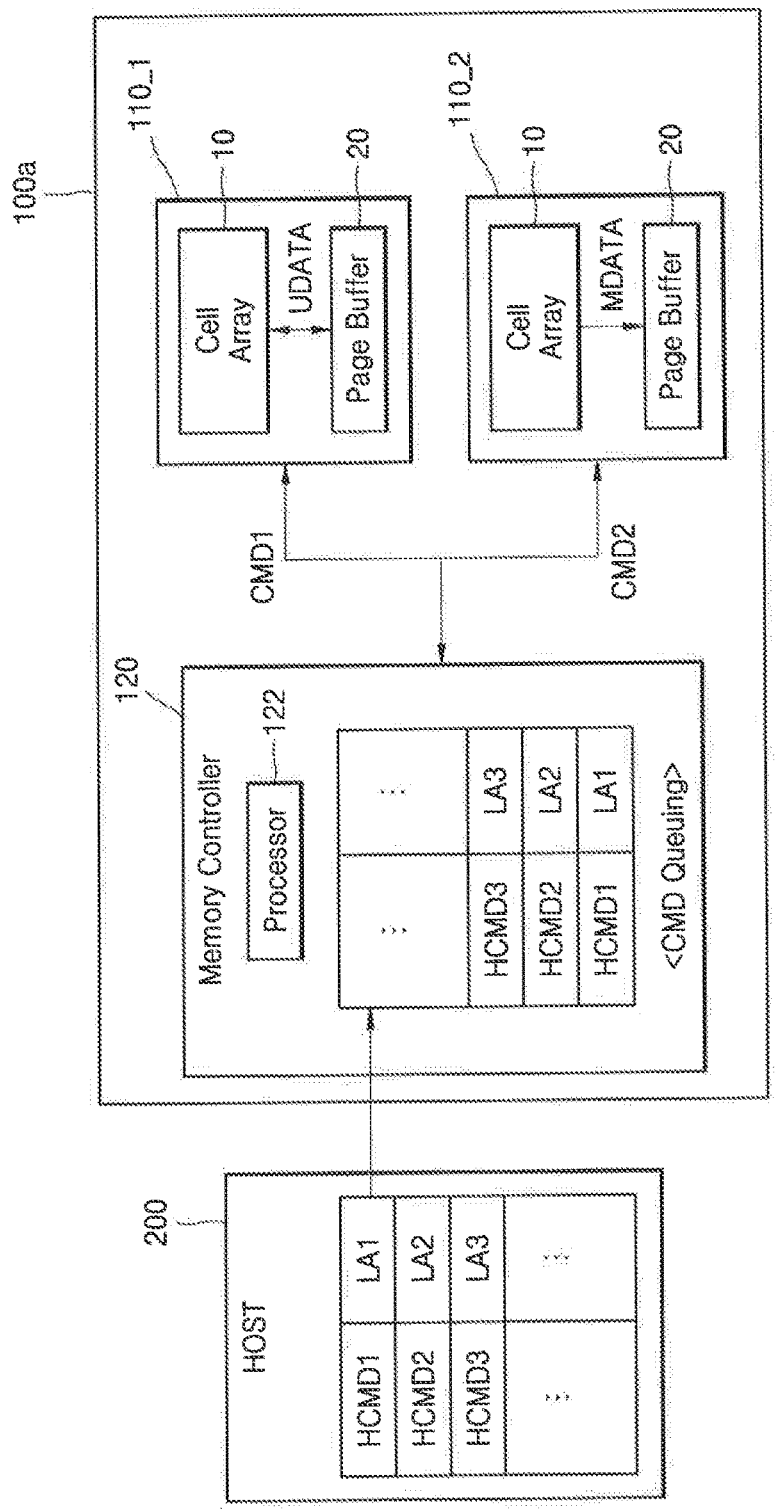
FIG. 11 is a block diagram of a nonvolatile memory system according to an exemplary embodiment of the inventive concept.

FIG. 11 is a block diagram of a nonvolatile memory system 100*a* and a host 200 that communicates with the nonvolatile memory system 100*a*, according to an exemplary embodiment of the inventive concept.

Referring to FIG. 11, the nonvolatile memory system 100*a* may include the memory controller 120 and first and second nonvolatile memory devices 110_1 and 110_2. Although the nonvolatile memory system 100*a* includes two nonvolatile memory devices in FIG. 11, the number of nonvolatile memory devices is not limited thereto. The first and second nonvolatile memory devices 110_1 and 110_2 may be different chip packages. Alternatively, the first and second nonvolatile memory devices 110_1 and 110_2 may be the same chip package and may be different dies. Each of the first and second nonvolatile memory devices 110_1 and 110_2 includes the memory cell array 10 and the page buffer 20. The memory cell array 10 of each of the first and second nonvolatile memory devices 110_1 and 110_2 may store the mapping data MDATA. Alternatively, one, for example, the second nonvolatile memory device 110_2, may include the mapping data MDATA, and the other, for example, the first nonvolatile memory device 110_1, may not store the mapping data MDATA.

The first and second nonvolatile memory devices 110_1 and 110_2 may simultaneously operate. When the first nonvolatile memory device 110_1 performs a write or read operation of the user data UDATA according to a first command CMD1, the second nonvolatile memory device 110_2 may previously load the mapping data MDATA that is stored in the memory cell array 10 into the page buffer 20 of the second nonvolatile memory device 110_2. After the write or read operation of the first nonvolatile memory device 110_1 is completed, when the second nonvolatile memory device 110_2 performs a write or read operation according to a second command CMD2 that is received from the memory controller 120 and a map hit occurs in the mapping data MDATA that is previously loaded into the page buffer 20 of the second nonvolatile memory device 110_2, the mapping data MDATA may be read from the page buffer 20 of the second nonvolatile memory device 110_2. Accordingly, a time taken to sense the mapping data MDATA from the memory cell array 10 may be reduced.

The memory controller 120 may support command queuing. The host 200 may continuously transmit host commands HCMD1 through HCMD3 and logical addresses LA1 through LA3 to the memory controller 120 without waiting for a response to a host command that is transmitted to the nonvolatile memory system 100*a*. The memory controller 120 may queue the received host commands HCMD1 through HCMD3 and the received logical addresses LA1 through LA3 and may sequentially or simultaneously process requests according to the host commands HCMD1 through HCMD3. For example, the memory controller 120 may transmit the first command CMD1 corresponding to the first host command HCMD1 to the first nonvolatile memory device 110_1 and may transmit the second command CMD2 corresponding to the second host command HCMD2 to the second nonvolatile memory device 110_2. The first and second nonvolatile memory devices 110_1 and 110_2 may operate respectively in response to the received first and second commands CMD1 and CMD2.

While sequentially processing the host commands HCMD1 through HCMD3, the memory controller 120 may previously load into the page buffer 20 mapping data for logical addresses of host commands to be processed a next time. For example, the first command CMD1 corresponding to the first host command HCMD1 may be transmitted to the first nonvolatile memory device 110_1, and the user data UDATA may be written to or read from the first nonvolatile memory device 110_1. In this case, the processor 122 may determine whether mapping data corresponding to the logical address LA2 of the second host command HCMD2 that is a next host command is stored in the page buffer 20 or a storage unit (not shown) that is provided in the memory controller 120, and when it is determined that the mapping data is not stored, the processor 122 may control the mapping data to be previously loaded into the page buffer 20. If the mapping data is stored in the memory cell array 10 of the second nonvolatile memory device 110_2, the mapping data may be loaded into the page buffer 20 of the second nonvolatile memory device 110_2. When the mapping data is stored in the memory cell array 10 of the first nonvolatile memory device 110_1, the mapping data may be loaded into the page buffer 20 of the first nonvolatile memory device 110_1 after a program operation or a sensing operation of the first nonvolatile memory device 110_1 on the memory cell array 10 ends.

Figure 12:
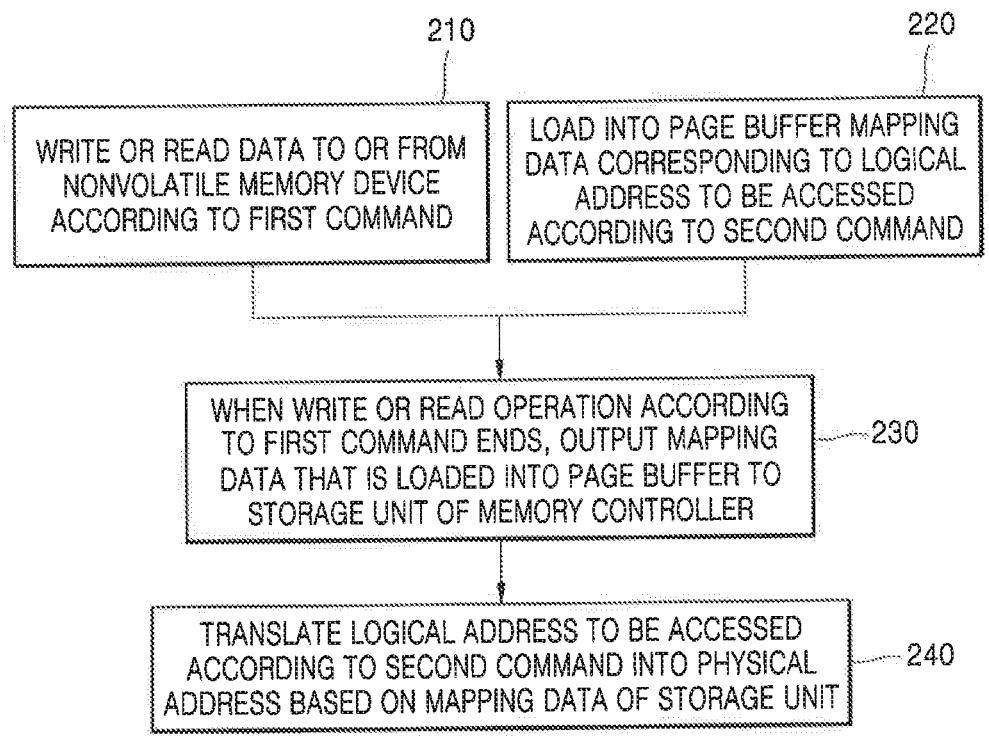
FIG. 12 is a flowchart of a method of operating the nonvolatile memory system of FIG. 11, according to an exemplary embodiment of the inventive concept.

FIG. 12 is a flowchart of a method of operating the nonvolatile memory system 100a of FIG. 11, according to an exemplary embodiment of the inventive concept.

Referring to FIG. 12, in operation S210, data is written or read to or from the nonvolatile memory device according to a first command. In operation S220, mapping data corresponding to a logical address of a second command is loaded into the page buffer 20. The second command may be performed after an operation of the nonvolatile memory system 100a according to the first command ends. The mapping data corresponding to the logical address of the second command may be previously loaded into the page buffer 20 before the second command is performed.

After a write or read operation according to the first command ends, in operation S230, the mapping data that is loaded into the page buffer 20 may be output. The mapping data may be transmitted to the memory controller 120 and may be stored in the storage unit that is provided in the memory controller 120.

In operation S240, the logical address of the second command may be translated into a physical address based on the mapping data that is stored in the storage unit.

Since the nonvolatile memory system 100a of FIG. 11 may determine a next command to be performed after a current command and a logical address of the next command, based on command queuing, the nonvolatile memory system 100a may previously load mapping data including mapping information of a logical address into the page buffer 20, a map hit ratio may be increased.

Figure 13:
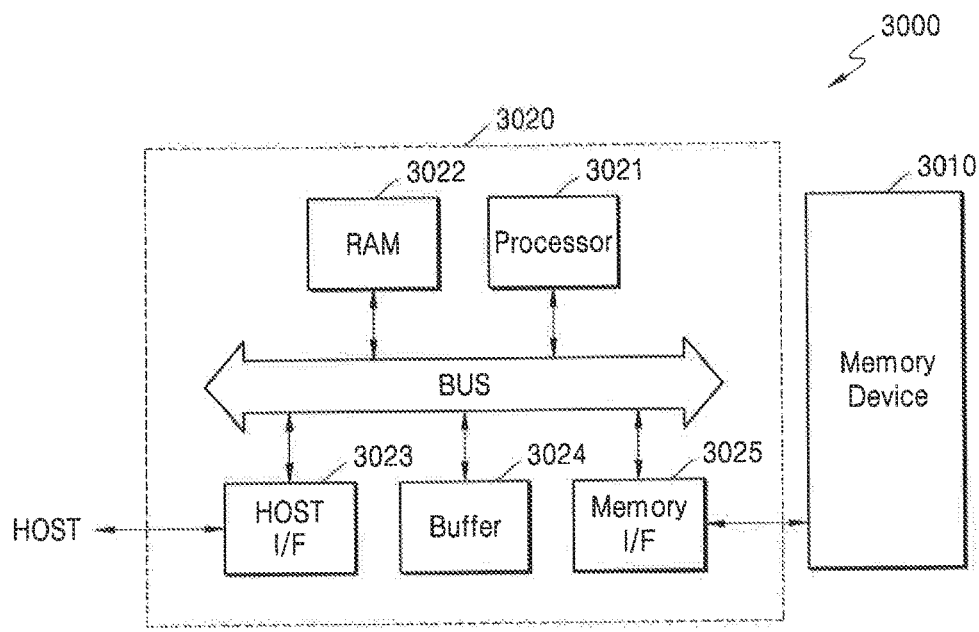
FIG. 13 is a block diagram of a solid-state drive (SSD) according to an exemplary embodiment of the inventive concept.

FIG. 13 is a block diagram of a solid-state drive (SSD) 3000 according to an exemplary embodiment of the inventive concept.

Referring to FIG. 13, the SSD 3000 includes an SSD controller 3020 and a memory device 3010. The SSD controller 3020 may be the memory controller 120 of FIG. 1, and the memory device 3010 may be the nonvolatile memory device 110 of FIG. 1. The SSD controller 3020 may include a processor 3021, RAM 3022, a host interface 3023, a cache buffer 3024, and a memory interface 3025. The components of the SSD controller 3020 may communicate via a bus. The processor 3021 controls the memory interface 3025 to transmit/receive data to/from the memory device 3010 in response to a request (e.g., a command, an address, or data) of a host (not shown). The processor 3021 and the memory interface 3025 of the SSD controller 3020 of FIG. 13 may be realized as one ARM processor. Data that is necessary to operate the processor 3021 may be loaded into the RAM 3022.

The host interface 3023 may receive a request of the host and may transmit the request to the processor 3021, or may transmit data that is received from the memory device 3010 to the host. The host interface 3023 may interface with the host via any of various interface protocols such as USB, man machine communication (MMC), peripheral component interconnect-express (PCI-E), SATA, parallel advanced technology attachment (PATA), SCSI, enhanced small device interface (ESDI), or intelligent drive electronics (IDE). Data that is to be transmitted to the memory device 3010 or is transmitted from the memory device 3010 may be temporarily stored in the cache buffer 3024. The cache buffer 3024 may be an SRAM.

Since the SSD 3000 previously loads at least part of mapping data into a page buffer (not shown) that is provided in the memory device 3010 before receiving a command or an address from the host, a map hit ratio may be increased. In addition, since the page buffer of the SSD 3000 is used as a cache of the mapping data, a cache capacity of the SSD 3000 may be increased without increasing circuit size.

Figure 14:
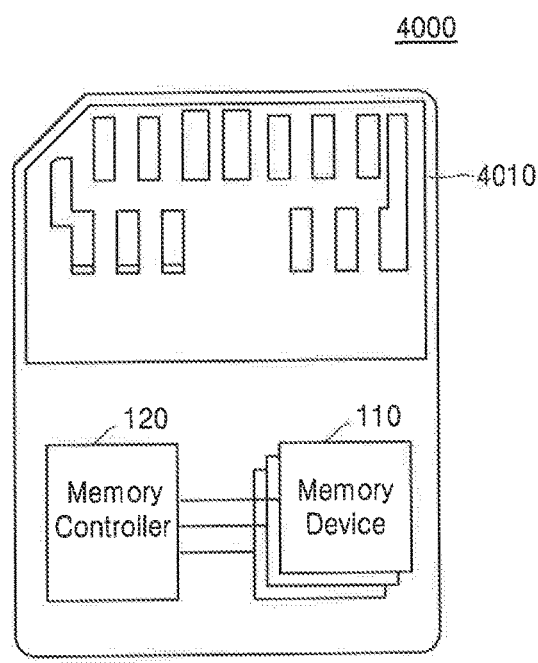
FIG. 14 is a view illustrating a memory card according to an exemplary embodiment of the inventive concept.

FIG. 14 is a view illustrating a memory card 4000 according to an exemplary embodiment of the inventive concept. The memory card 4000 may be a portable storage device that may be used by being connected to an electronic device such as a mobile device or a desktop computer. As shown in FIG. 14, the memory card 4000 may include the memory controller 120, the nonvolatile memory device 110, and a port area 4010.

The memory card 4000 may communicate with an external host (not shown) by using the port area 4010, and the memory controller 120 may control the nonvolatile memory device 110. The memory controller 120 may read a program from a ROM (not shown) that stores a program and may perform the program. The nonvolatile memory system of FIG. 14 may be managed by the memory controller 120. The nonvolatile memory device 110 may include a cell array such as a NAND flash memory cell array or a NOR flash memory cell array.

In addition, as in the above described embodiments, since the memory controller 120 previously loads mapping data into a page buffer (not shown) that is provided in the nonvolatile memory device 110 before receiving an external command, a map hit ratio may be increased. Accordingly, the performance of the memory card 4000 may be improved. In addition, since the page buffer of the memory card 4000 is used as a cache of the mapping data, a cache capacity of the memory card 4000 may be increased without increasing a circuit size.

Figure 15:
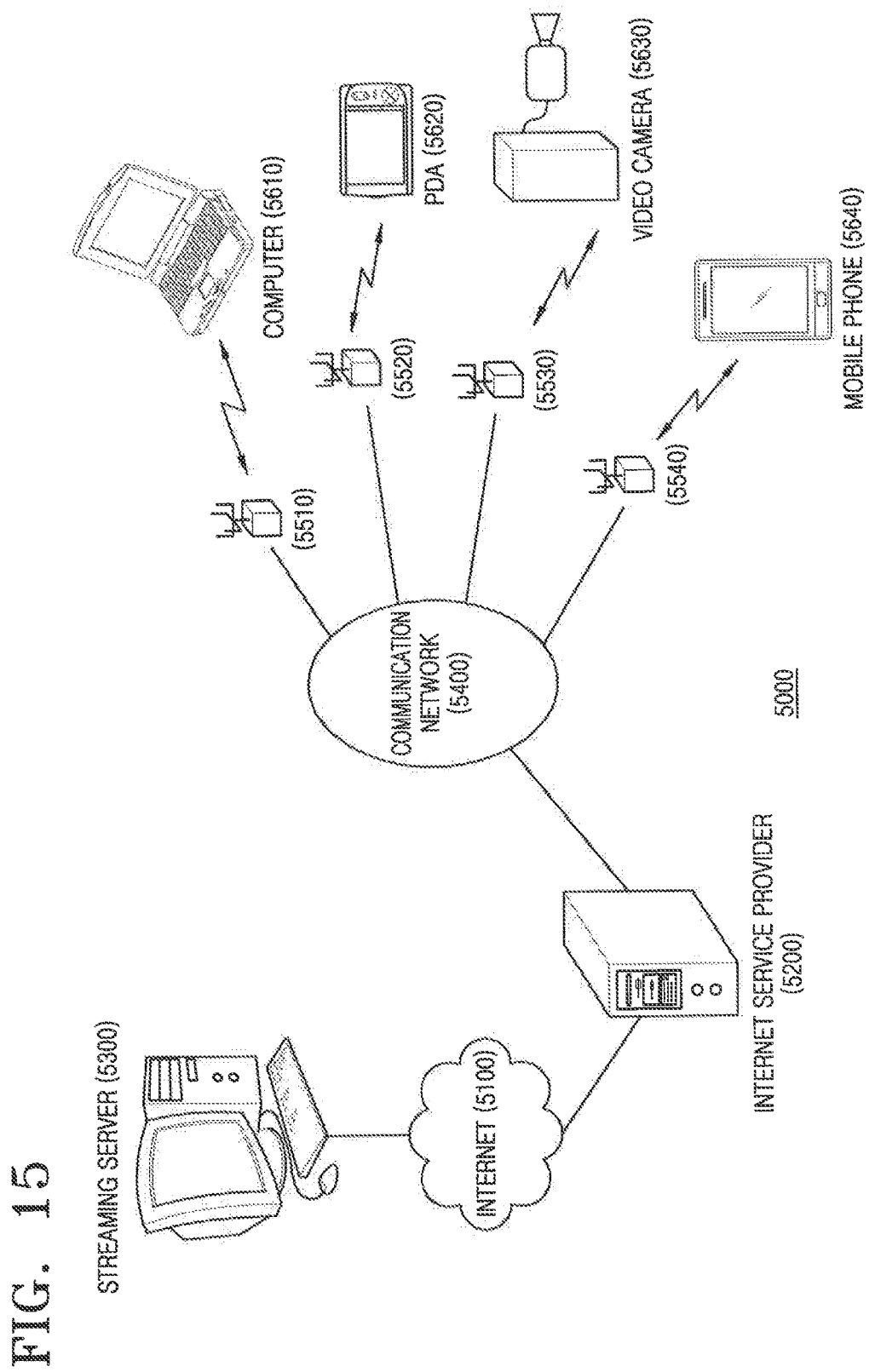
FIG. 15 is a view illustrating a content transmitting/receiving system in which a plurality of devices transmit/receive content via a communication network, according to an exemplary embodiment of the inventive concept.

FIG. 15 is a view illustrating a content transmitting/receiving system 5000 in which a plurality of devices transmit/receive content via a communication network 5400, according to an exemplary embodiment of the inventive concept. A service area of a communication system may be divided into cells each having a predetermined size, and wireless base stations 5510 through 5540 may be respectively provided in the cells.

The content transmitting/receiving system 5000 may include a plurality of independent devices. For example, the independent devices such as a computer 5610, a personal digital assistant (PDA) 5620, a camera 5630, and a mobile phone 5640 are connected to the Internet 5100 through an internet service provider 5200, the communication network 5400, and the wireless base stations 5510 through 5540. A streaming server 5300 may also be connected to the Internet 5100. However, the content transmitting/receiving system 5000 is not limited to the structure of FIG. 15, and the independent devices may be selectively connected. The independent devices may be directly connected to the communication network 5400 without going through the wireless base stations 5510 through 5540. The video camera 5630 is an imaging device for capturing a video such as a digital video camera. The mobile phone 5640 may use at least one communication method selected from various protocols such as personal digital communications (PDC), code division multiple access (CDMA), wideband code division multiple access (W-CDMA), global system for mobile communications (GSM), and personal handy-phone system (PHS).

A host and a nonvolatile memory system according to an exemplary embodiment of the inventive concept may be included in each of the independent devices. For example, each of the independent devices such as the computer 5610, the PDA 5620, the camera 5630, and the mobile phone 5640 may include the host including a processor for controlling an overall operation of the corresponding independent device, and may also include the nonvolatile memory system that stores in nonvolatile fashion various pieces of information that are used for the corresponding independent device. For example, the nonvolatile memory system may be configured to include a memory controller and a flash memory device, or may be configured such that an independent memory card is provided in the corresponding independent device.

Figure 16:
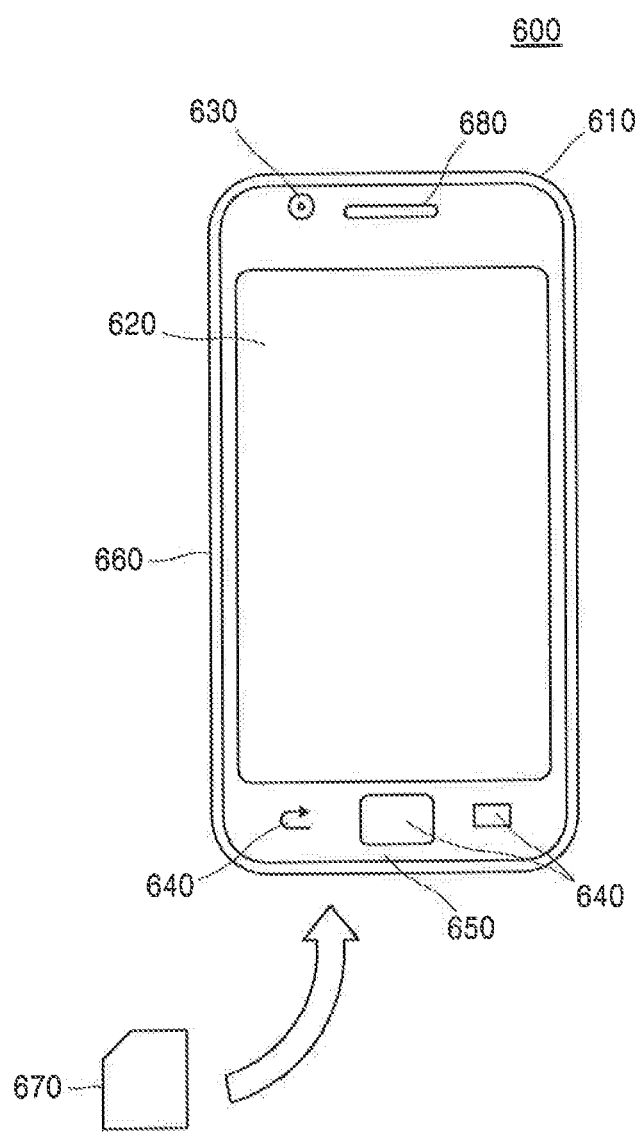
FIG. 16 is a plan view illustrating a mobile terminal on which a host and a nonvolatile memory system are mounted, according to an exemplary embodiment of the inventive concept.

FIG. 16 is a plan view illustrating a mobile terminal 600 on which a host and a nonvolatile memory system are mounted, according to an exemplary embodiment of the inventive concept. The mobile terminal 600 of FIG. 16 may correspond to the mobile phone 5640 of FIG. 15, and an AP may be provided in the mobile terminal 600. The mobile terminal 600 may be a smart phone of which a function is not limited and may be changed or expanded by using an AP. The mobile terminal 600 includes an internal antenna 610 for exchanging a radio frequency (RF) signal with a wireless base station. The mobile terminal 600 includes a display screen 620 such as a liquid crystal display (LCD) screen or an organic light-emitting diode (OLED) screen for displaying images that are received by the internal antenna 610 and are decoded, or images that are captured by a camera 630. The mobile terminal 600 may also include an operation panel 640 that includes a control button and a touch panel. In addition, when the display screen 620 is a touch screen, the operation panel 640 may further include a touch sensing panel of the display screen 620. The mobile terminal 600 includes a speaker 680 or another type of sound output unit for outputting a sound or a voice, and a microphone 650 or another type of sound input unit for inputting a sound or a voice. The mobile terminal 600 further includes the camera 630 such as a charge-coupled device (CCD) camera for capturing a video or a still image. In addition, the mobile terminal 600 may include a storage unit 670 for storing encoded or decoded data such as a video or a still image that is captured by the camera 630, is received via email, or is obtained by using another method, and a slot 660 for inserting the storage unit 670 into the mobile terminal 600. The storage unit 670 may be a nonvolatile memory system as in the above described embodiments, and may be an SD card, a UFS, an eMMC, or another type of flash memory such as an EEPROM that is embedded in a plastic case.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A nonvolatile memory system, comprising:
a nonvolatile memory device that comprises a nonvolatile memory cell array and a page buffer internally connected to bit lines of the nonvolatile memory cell array, wherein the page buffer is disposed inside the nonvolatile memory device and the page buffer buffers data while the data is programmed into the memory cell array or while the data is read from the memory cell array; and
a memory controller that transmits a first command to the nonvolatile memory device such that the nonvolatile memory device loads into the page buffer mapping data that is stored in the nonvolatile memory cell array, receives a logical address from outside the memory controller after the mapping data is loaded into the page buffer, and transmits a second command to the nonvolatile memory device if it is determined that the mapping data includes mapping information for the logical address,
wherein the page buffer of the nonvolatile memory device transmits the mapping data to the memory controller in response to the second command, and the memory controller translates the logical address into a physical address based on the mapping data that is received from the page buffer.

2. The nonvolatile memory system of claim 1, wherein when the memory controller comprises a storage unit, the memory controller stores part of the mapping data that is stored in the nonvolatile memory cell array in the storage unit, and instructs the nonvolatile memory device to load another part of the mapping data into the page buffer.

3. The nonvolatile memory system of claim 1, wherein when the mapping data includes the mapping information corresponding to the logical address, the memory controller receives the mapping data output from the page buffer, stores the output mapping data in a storage unit that is provided in the memory controller, and performs address translation by using the mapping data stored in the storage unit.

4. The nonvolatile memory system of claim 1, wherein the page buffer comprises:
a first register that temporarily stores data that is to be programmed into the nonvolatile memory cell array or data that is to be sensed from the nonvolatile memory cell array; and
a second register that loads the mapping data from the nonvolatile memory cell array.

5. The nonvolatile memory system of claim 4, wherein the second register loads the mapping data from the nonvolatile memory cell array, or receives next data that is to be programmed into the nonvolatile memory cell array from the memory controller and temporarily stores the received next data.

6. The nonvolatile memory system of claim 1, wherein after data is read from the nonvolatile memory device or after the nonvolatile memory device enters an idle state, the memory controller instructs the nonvolatile memory device to load the mapping data into the page buffer.

7. The nonvolatile memory system of claim 1, wherein the memory controller queues first and second commands that are sequentially received from the outside of the memory controller, and during a read or write operation according to the first command, the memory controller instructs the nonvolatile memory device to load into the page buffer the mapping data comprising map information corresponding to the logical address corresponding to the second command.

8. The nonvolatile memory system of claim 1, wherein the nonvolatile memory cell array comprises a first area and a second area,
wherein the mapping data is stored in the first area and user data is stored in the second area.

9. The nonvolatile memory system of claim 8, wherein the first area comprises single-level cells that store 1-bit data per cell.

10. The nonvolatile memory system of claim 1, wherein the memory controller instructs the nonvolatile memory device to load into the page buffer part of the mapping data that is selected based on a last access time or an access frequency of the mapping data that is stored in the nonvolatile memory cell array.

11. The nonvolatile memory system of claim 1, wherein the memory controller comprises an interface unit that receives data from the outside of the memory controller or transmits data to the outside of the memory controller, wherein the interface unit performs command queuing.

12. The nonvolatile memory system of claim 1, wherein the nonvolatile memory system is applicable to a mobile electronic device.

13. A method of operating a nonvolatile memory system, the method comprising:
providing, by a memory controller, a control signal to a nonvolatile memory device;
loading, by the nonvolatile memory device, at least part of mapping data from a nonvolatile memory cell array into a page buffer in response to the control signal, wherein the page buffer buffers data while the data is programmed into the memory cell array or while the data is read from the memory cell array, the page buffer receives the at least part of the ma ping data through bit lines of the nonvolatile memory cell array, and the page buffer and the nonvolatile memory cell array are disposed inside the nonvolatile memory device;
receiving, by the memory controller, a command and a logical address from outside the memory controller;
transmitting, by the memory controller, a data output command to the nonvolatile memory device if a map hit occurs in the at least part of the mapping data loaded in the page buffer;
transmitting, by the page buffer, the at least part of the mapping data to the memory controller in response to the data output command, and
translating, by the memory controller, the logical address into a physical address based on the at least part of the mapping data that is received from in the page buffer.

14. The method of claim 13, wherein the translating of the logical address comprises:
when the mapping data includes mapping information corresponding to the logical address, the method further comprises: outputting the mapping data from the page buffer and storing the mapping data in a storage unit of the memory controller, and
translating the logical address into the physical address by using the mapping data stored in the storage unit.

15. The method of claim 13, wherein the loading of the at least part of the mapping data into the page buffer comprises queuing a first command and a second command that are sequentially received from the outside of the memory controller, and during a read or write operation according to the first command, loading into the page buffer the mapping data comprising mapping information corresponding to the logical address corresponding to the second command.

16. A nonvolatile memory system, comprising:
a nonvolatile memory device including a memory cell array and a page buffer connected to bit lines of the memory cell array, wherein the page buffer buffers data while the data is programmed into the memory cell array or while the data is read from the memory cell array and the memory cell array is configured to store mapping data in a first time period; and
a memory controller configured to instruct the page buffer to receive the mapping data through the bit lines from the memory cell array and cache the mapping data in a second time period, determine whether a map hit occurs in the cached mapping data in response to a command and a logical address in a third time period, receive the cached mapping data from the page buffer when there is a map hit in a fourth time period, and translate the logical address into a physical address based on the received cached mapping data in a fifth time period,
wherein the first, second, third, fourth and fifth time periods occur in sequence.

17. The nonvolatile memory system of claim 16, wherein the mapping data is cached in the page buffer after a read operation or when the nonvolatile memory device is in an idle state.

18. The nonvolatile memory system of claim 16, wherein the map hit occurs when the logical address is found in the mapping data that was cached in the page buffer.

19. The nonvolatile memory system of claim 16, wherein the memory controller includes a storage unit configured to store the cached mapping data received from the page buffer.

20. The nonvolatile memory system of claim 16, wherein the memory controller includes a flash translation layer configured to translate the logical address into the physical address.

* * * * *